Dec. 19, 1950     H. R. HUTCHINGS     2,534,600
DUST FILTER

Filed Sept. 4, 1946     4 Sheets-Sheet 1

Horace R. Hutchings, Inventor

By

Attorney

Dec. 19, 1950  H. R. HUTCHINGS  2,534,600
DUST FILTER
Filed Sept. 4, 1946  4 Sheets-Sheet 2

Inventor
Horace R. Hutchings
By
Attorney

Dec. 19, 1950 H. R. HUTCHINGS 2,534,600
DUST FILTER
Filed Sept. 4, 1946 4 Sheets-Sheet 3

Inventor
Horace R. Hutchings
By
Attorney

Dec. 19, 1950     H. R. HUTCHINGS     2,534,600
DUST FILTER
Filed Sept. 4, 1946     4 Sheets-Sheet 4
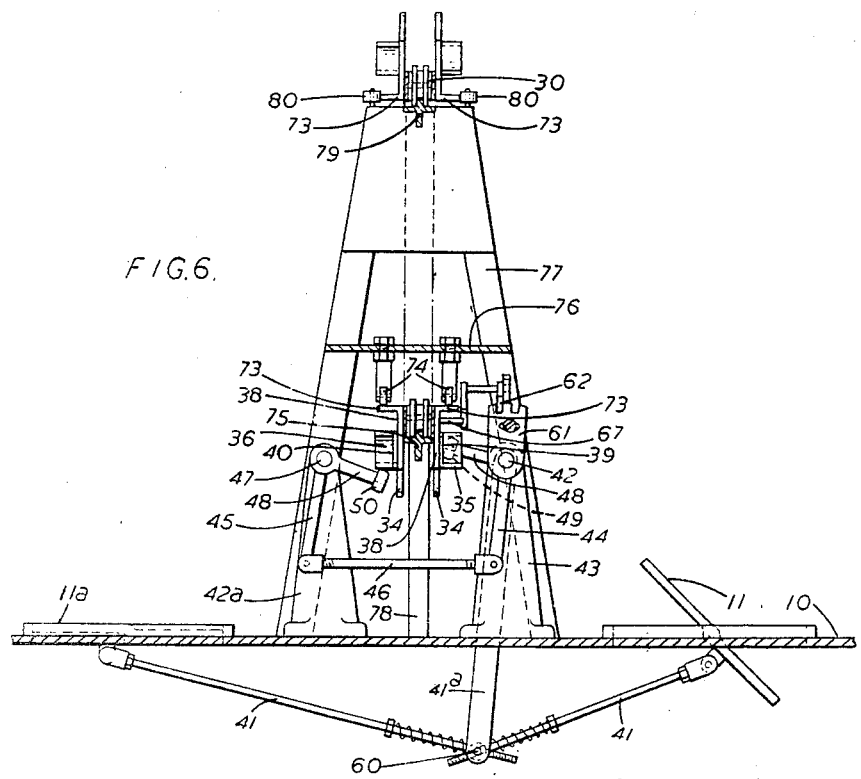
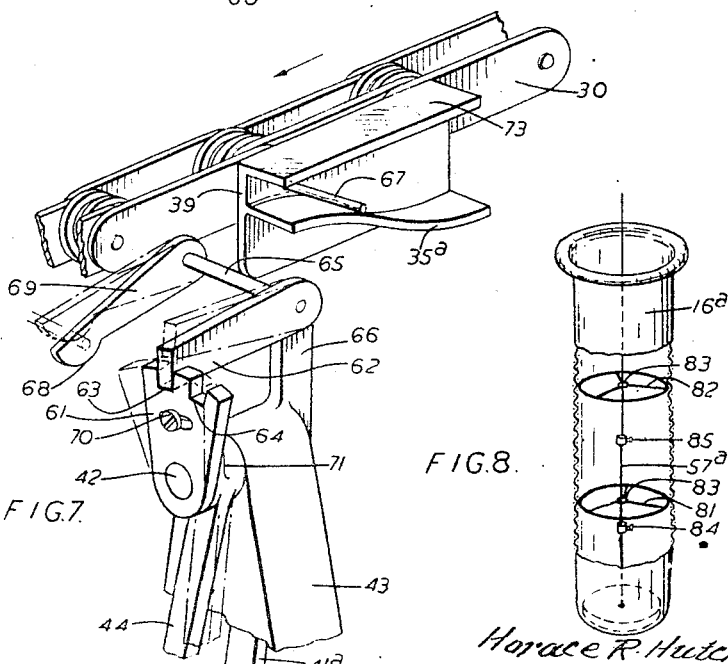
Inventor
Horace R. Hutchings
by J. M. Imrie, Attorney

UNITED STATES PATENT OFFICE 2,534,600

DUST FILTER

Horace Reginald Hutchings, Purley, England

Application September 4, 1946, Serial No. 694,722
In Great Britain September 3, 1945

Section 1, Public Law 690, August 8, 1946
Patent expires September 3, 1965

10 Claims. (Cl. 183—54)

This invention relates to dust collectors or filters of the type comprising a number of filter bags arranged in separate compartments either singly or in groups, agitating means for the bags and means comprising valves for causing the flow of dust laden air to the bags temporarily to give place, compartment by compartment, to a counter-flow of scavenging air only therethrough, there being a valve for controlling the dust laden air and a valve for controlling the scavenging air to each compartment and the agitating means being arranged to agitate the bags whilst they receive the scavenging air. The apparatus, therefore, carries out a working cycle wherein scavenging air only flows into each compartment in turn, to effect bag-cleaning, whilst the bag or bags in the other compartment or compartments filter dust laden air. This cycle may be repeated as often as desired; in the larger apparatus the cycle is usually repeated continuously.

One object of the invention is the provision of apparatus having operating mechanism for the agitating means and for the valves which, as far as I am aware, is simpler and lighter than the mechanisms at present in use for these purposes has fewer moving and wearing parts and is readily replaceable and is adaptable to change as regards speed of agitator and valve operation, speed of valve opening and closing, and duration of the agitation periods and of the open and closed periods of the valves.

Another object of the invention is the provision of operating mechanism which allows of a larger number of bags or sections to be included in a cycle of operation than has been the case hitherto.

The principal feature of the invention resides in the provision in the collector of an endless element such as a chain, belt or the like provided with members adapted to control the valves and to effect the requisite agitation of the bags as the said element is driven.

Owing to the use of an endless element a much larger number of sections may be included in a working cycle than has been the case in the known mechanisms wherein rotary cams are used. In the said known mechanisms the cams operate in sequence during one revolution of their common shaft and the angle subtended by that part of each cam profile which effects controlling operations for the valves of the corresponding section or compartment has to be decreased as the number of sections is increased. Of necessity, this angle is limited. The present apparatus, because the members which operate the valves move linearly during their valve controlling runs, is not subject to such limitation. For example, 20 to 30 sections could be worked in one cycle yet only one group of bags need be cleaned at a time whereas with the known mechanisms for a like number of bags, duplication of the operating mechanism would be necessary and this would necessitate two or more sections being cleaned at the same time. Moreover, in the present apparatus groups of sections or compartments may be arranged in parallel when desired. For example, twenty sections may be arranged in two lines of ten and yet, owing to the use of chains or the like only one section need be cleaned at a time as by using one set of cams per line, the bags in one line can be shaken while the cams controlling the other line are idle, and vice versa.

The bags may be of any suitable type and in cases where the weighted bottoms of the bags are lifted and dropped each of the bags is, in accordance with yet another feature of the present invention, lifted intermediately of its ends as well as at its bottom whereby the proportion of the bag which crinkles or concertinas when the bag is lifted and "snatches" when the bottom of the bag is dropped is greater than in the case where only the bottom of the bag is lifted and dropped. This ensures that the whole or a very large proportion of the bag is agitated. The intermediate lifting may be effected at one zone or point, say the middle, or at a number of zones or points.

The invention will now be described with reference to the accompanying drawings, the bags shown being of the type which are lifted from their bottoms.

In these drawings:

Fig. 6 is an end sectional elevation showing, more particularly, the way in which the chain and valve-operating elements are mounted and arranged, the plane of section being indicated by the line VI—VI, Fig. 5;

Fig. 7 is a perspective view showing, more particularly, mechanism for locking the valves in either of the positions they occupy during operation of the apparatus; and Fig. 8 is a part sectional perspective view of a bag adapted to be lifted at three zones whereby three "snatches" are produced when it is dropped.

Figure 1:
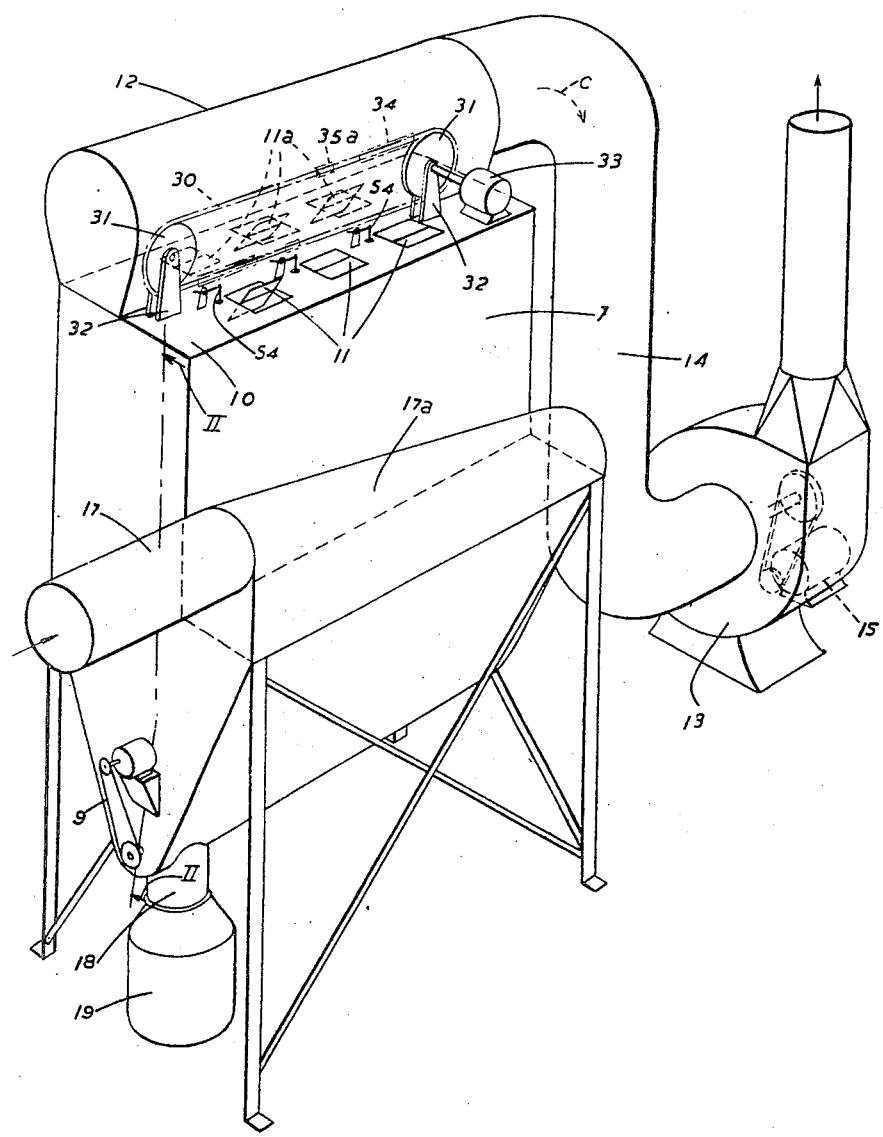
Fig. 1 is a diagrammatic perspective view of a dust collector or filter having three sets of control valves, said collector being able, therefore, to have three groups of bags.
Figure 2:
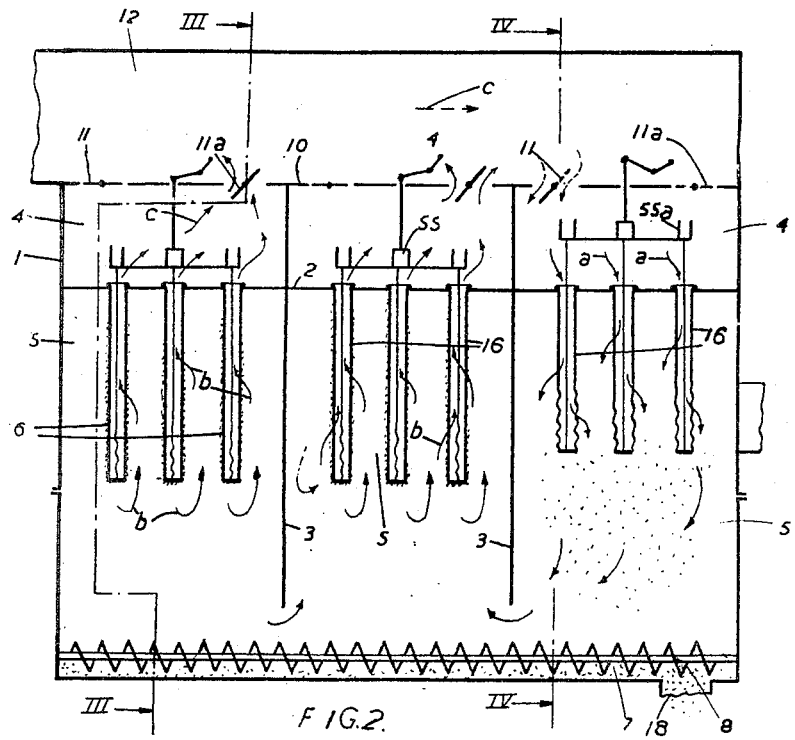
Fig. 2 is a diagrammatic front sectional elevation of the apparatus in the plane indicated by the line II—II, Fig. 1, the axes of the valves 11, 11a being at right angles to their actual positions for the sake of clarity of illustration.
Figure 3:
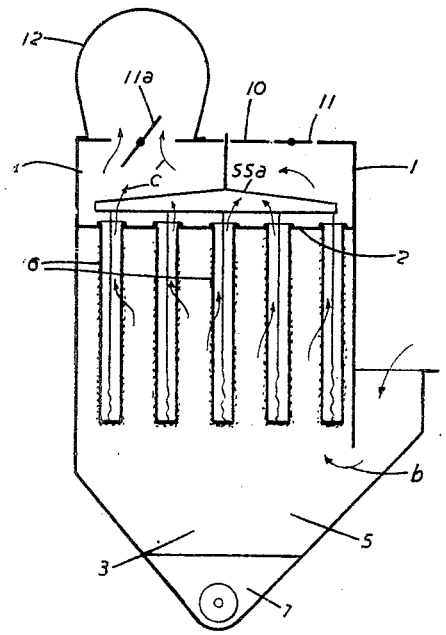
Fig. 3 is a diagrammatic end sectional elevation of the apparatus in the plane indicated by the line III—III, Fig. 2.
Figure 4:
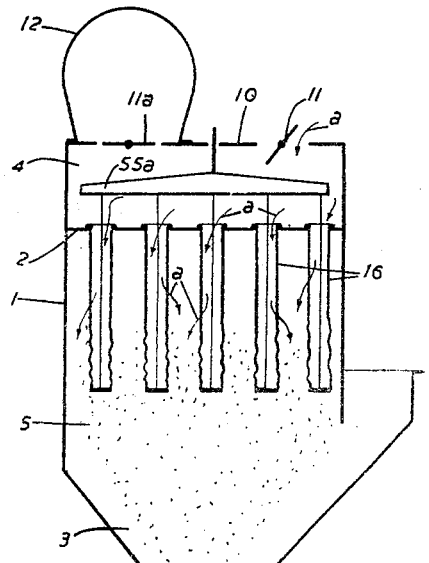
Fig. 4 is a diagrammatic end sectional elevation of the apparatus in the plane indicated by the line IV—IV, Fig. 2.
Figure 5:
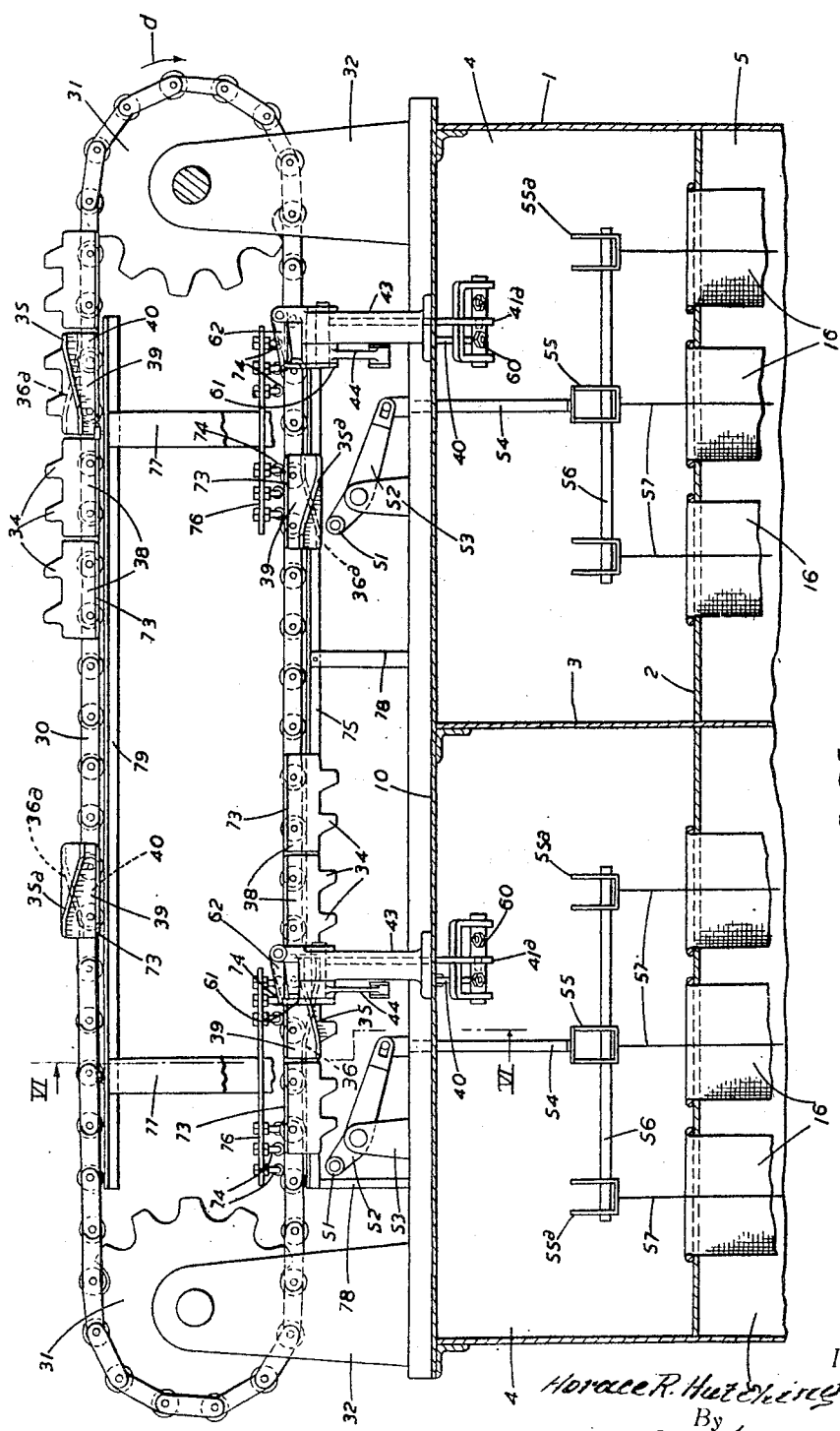
Fig. 5 is a front elevation, partly in section, which shows, more particularly, the endless chain for opening and closing the valves and for agitating the bags, the valve-operating elements and the bag agitating elements also being shown in this figure.

The collector shown in Fig. 5 deals with two groups of bags whereas that shown in Figs. 1 to 4 deals with three groups. Apart from this difference the two collectors may be regarded as identical and in the following will be regarded as though they were one and the same apparatus.

The principle on which the apparatus extracts dust from dust laden air is well known but a brief description of the general form of the substantially known part of the apparatus and the said principle will first be set forth for convenience in subsequently describing the invention.

The hollow case 1 of the apparatus is divided into compartments by horizontal and vertical partitions 2 and 3, respectively, the compartments above the horizontal partition being indicated by 4 and those below it by 5. The compartments 5 are open at their bottoms to the bottom 7 of the hollow body, which bottom is of troughlike form and contains a screw conveyor 8 driven by an electric motor and gearing generally indicated by 9. The roof 10 of the compartments 4 contains pairs of valves or dampers 11 and 11a, one pair to each compartment; the valves 11 when open, open the compartments to atmosphere whereas the valves 11a when open, open the compartments to a header 12 connected to the intake of a fan 13 by a duct 14. The fan is driven by a motor generally indicated by 15. Each compartment 5 contains a group of filter bags 16 the mouths of which latter are open to the compartment 4 immediately above the compartment 5 containing them.

The fan 13 draws dust laden air and scavenging air through the apparatus, the dust laden air entering the apparatus at 17 and the scavenging air entering it through whichever of the valves 11 is open for the time being. When the valve 11 is open its fellow 11a is closed whilst the remaining valves 11 and 11a are closed and open, respectively, as will be clear by reference to Fig. 1 more particularly. It will be understood that all valves go through open and closed periods during the working of the apparatus but preferably only one valve 11 is open at any time.

As a result of the valve arrangement scavenging air is sucked into a compartment 4 by the fan through whichever of the valves 11 is open whilst the dust laden air is sucked into the compartments 5 through the inlet 17 and the header 11a, which latter delivers to all compartments 5.

The scavenging air enters the bags through their mouths and after passing through their pores enters the compartment 5 containing them and so joins the main stream of dust laden air.

The dust laden air and the scavenging air mixed therewith is sucked into the remaining bags through their pores and passes thence to the fan by way of the corresponding compartments 4, the open valves 11a, the header 12 and the duct 14.

Dust in the dust laden air is deposited on the outsides of the bags; the scavenging air displaces the previously deposited dust which latter falls into the trough containing the conveyor 8. The conveyor discharges the dust through an outlet duct 18 connected to a removable collector 19 in air tight manner.

The scavenging air is indicated by arrows $a$, the dust laden air by arrows $b$. Air which has passed from the bags after entering them from the compartments 5 is indicated by the arrows $c$.

In order more effectively to remove the dust from the bags being scavenged these bags are agitated at the same time as scavenging air is passed through them.

In accordance with the present invention the valves and the agitator are operated in correct timed relation by means comprising an endless element. This means, which has an endless element in the form of an endless chain, will now be described with reference to the example shown on the accompanying drawings.

The chain is indicated by 30, Figs. 1, 5, 6 and 7; it is supported by chain wheels 31 borne by brackets 32 fixed to the roof 10 and extends longitudinally of the latter. A reduction motor 33 (Fig. 1) drives one of the chain wheels and hence the chain. On the sides of the chain are cams 34 for agitating the bags and at the outsides of some of the cams 34 are the leading cams 35 and 36 of pairs of cams 35—35a and 36—36a for operating the valves. The cams 34 are, preferably, in the form of teeth or a series of teeth on plates or sections 38 so as not to impair the flexibility of the chain, and the cams 35—35a and 36—36a are on plates 39 and 40, respectively, the plates 39 and 40 of the cams 35 and 36 being in register with the side of a plate 38 and the plates 39 and 40 of the cams 35a and 36a being at the sides of the chain. Bolts passing through the hollow pins of the chain rollers hold the plates in place.

The valves are of centrally pivoted clack type, as best shown in Fig. 6, adapted to be opened and closed by push-pull rods 41 operated by an oscillatable lever 41a. The pivot 42 of the lever 41a is borne by a bracket 43 fixed to the roof 10. The said pivot is rigid with a radius rod 44 which is connected to a similar and parallel rod 45 by a connecting rod 46. The pivot 47 of the rod 45 is borne by a bracket 42a fixed to the roof 10. The pivots 42 and 47 are rigid with arms 48 which terminate in cam followers 49 and 50 in the paths of the cams 35—35a and 36—36a, respectively, when the cams are in the lower flight of the chain.

In the path of the cams 34 when in the lower flight of the chain are followers 51 (Fig. 5) at the higher ends of inclined levers 52, said levers being pivotally supported by brackets 53 fixed to the roof 10. Vertical rods 54 pivotally connected to the lower ends of the levers and passing through the roof 10 are fixed to cross trees 55; these in turn are fixed to parallel cross trees 55a by bearers 56, and from the cross trees there depend cords 57 attached to the weighted bottoms of the bags.

When the chain is in motion in the direction indicated by the arrow $d$, Fig. 5, the leading cam 36 depresses a follower 50 and the oppositely set leading cam 35 allows the corresponding follower 49 to rise. This and the interlinking provided by the elements 44, 46, 45 results in the valves 11 and 11a associated with the followers being opened and closed, respectively, (as shown in Fig. 6); and they remain in this condition until the trailing cams 35a, 36a restore the followers to their previous position, resulting in the valve 11 being closed and the valve 11a being opened. The pairs of valves are operated in this way in succession as the cams travel with the lower flight of the chain.

As the cams 34 travel they oscillate the lever 52 associated with the bags in the compartment immediately beneath that in which the valve 11 allows air to enter, the cams 34 and 35—36 being timed relatively to ensure this. Oscillation of the lever by the cams 34 causes the cords 57 to lift the bottoms of the bags, with the result that the bags concertina, and to allow the said bottoms to drop smartly, with the result that the bags are "snatched" a number of times, causing dust to be shaken off them. This occurs at the same time as a current of atmospheric or scavenging air entering the apparatus through a valve 11 passes through the pores of the bags from the interior. The dual action ("snatching" and air flow) effectively cleans dust from the outside surfaces of the bags.

Before the cams 34 and 35—36 effect the agitation and operation of the next group of bags and pair of valves, respectively, the last of the run of cams 34 passes the follower 51 and the trailing cams 35a—36a close the previously opened valve 11 and open the previously closed valve 11a.

It will be seen by reference to Figs. 5 and 6 that the joints 60 between the bottom of the levers 41 and the push-pull rods 49 are of hinged and sliding type.

The mechanism preferably comprises means which locks the valves or dampers 11, 11a in the positions to which they are alternately moved by the cams 35—35a and 36—36a. One such means is best shown in Figs. 6 and 7. It comprises a toothed segment 61 fixed to the rod 44 and a pivoted locking bar 62 which is lifted just before the valves are operated and is dropped immediately after they are operated. It alternately drops, therefore, in the slots 63, 64 of its segment and as the segment is fixed to the rod 44 the rod and the valves are held against displacement until the bar is again lifted. The pivot 65 of the bar is borne by a finger 66 extending upwards from the bracket 43. The bar is lifted and dropped owing to the action of a projection 67 carried by the cams 35 and 35a on the cam surface 68 of a dog 69 fixed to the pivot 65. When the projection reaches the cam surface 68 it lifts the dog and, therefore, the bar and when it passes therefrom it allows the bar to drop, valve change-over having occurred in the meantime.

The segments 61 are adjustably fixed to the bars 44 by screw and slot connections as 70, Fig. 7, the screw engaging a lug 71 rigid with the bar 44.

Owing to the provision of the locking means the provision of "dwell" profiles between the cams 35—35a and 36—36a is unnecessary. Such profiles may be provided, however, in which case the locking means need not be used. The "dwell" profiles would be on plates like 39 and would be attached to the chain by the usual pins thereof.

When the cams are in operation it is desirable that they be held against rising. For this purpose the plates 38 carrying the cams 34 and the plates 39 of the cams 35a, 36a are flanged at their upper ends as indicated by 73, rollers 74 are rigidly mounted above the flanges in positions to engage the top faces thereof whilst the cams associated with the flanges are in operation, and a rigid track 75 is provided for the rollers of the lower flight of the chain. The rollers 74 are on cross plates 76 fixed to pedestals 77 mounted on the roof 10 and the track 75 is carried by arms 78 fixed to the said roof. It will thus be apparent that the cams do, when in operation, have three point support, one point being provided by the track 75 and the two remaining points being provided above it at opposite sides by the rollers 74.

The pedestals 77 also carry a track 79 for the upper flight of the chain; and also rollers 80 which help to prevent lateral play of the said flight by engaging the outer edges of the flanges 73.

As previously stated the bags may be lifted at one or more places intermediately of their ends as well as being lifted at their bottoms. A three-lift arrangement will now be described with reference to Fig. 8 of the accompanying drawings.

The bag 16a has spiders 81 and 82 about a third of the distance from the bottom and top, respectively, and at the centre of each spider is a ring 83. The cord 57a passes through the rings and is attached to the weighted bottom of the bag; on the cord, beneath and spaced from the rings, are two stops 84 and 85. The stop 85 is twice as far from the upper ring 83 as the stop 84 is from the lower one when the bag is normally suspended and the double distance is less than the total upward movement of the cord. Hence, when the cord is pulled upwards the bag is lifted first at its bottom, then at the spider 81 and finally at the spider 82. This results in the creation of three "concertina" zones, as will be evident; and when the bag is dropped there are as many separate "snatches" distributed along its length, causing a more complete casting off of collected dust than would be the case were there a single "snatch."

The cams 35—35a and 36—36a may be replaced by cams of grooved form, their operative faces or the faces of the grooves may be so disposed that the followers with which they cooperate are moved either upwards and downwards or towards and away from the sides of the chain. If desired the cams at one side of the chain and the corresponding elements comprising, for example, elements 48, 45 (with which 48 is rigid) and 46 may be dispensed with. In this case the cam at the other side of the chain is preferably of grooved form. If the cam or cams operate laterally the followers are preferably flanged.

The chain may be arranged to run in vertical, horizontal or any other suitable plane; the mechanism may be arranged on the side of the collector or at a low level and is not necessarily confined to use with bags suspended and shaken in the manner described in some detail herein but may be adapted for use with bags arranged in other ways. The valve arrangement may be altered as to position on the collector and as to type.

The mechanism may be adapted for manual operation if continuous cleaning is not required.

What I claim is:

1. A dust collector or filter comprising a plurality of filter bags, compartments for said bags, agitating means for the bags, means to circulate dust-laden air through the bags, valve means intermittently to cause a counterflow of scavenging air through said bags, locking means associated with the valve means adapted to hold said valve means in their open positions and closed positions except during change-over periods, and an endless element both to actuate said locking means and to effect agitation of the bags.

2. A dust collector or filter comprising a plurality of filter bags, compartments for said bags, agitating means for the bags, means to circulate dust-laden air through the bags, valve means intermittently to cause a counterflow of scavenging air through said bags, locking means to hold said valve means in the open or closed positions, said locking means including a toothed segment and a locking bar, normally lying within one of two gaps in the segment, an endless element temporarily to separate the bar and segment to effect release of the locking means, and means operated by said endless element to effect agitation of the bags.

3. A dust collector or filter comprising a plurality of filter bags, compartments for said bags, agitating means for said bags, means to circulate dust laden air through said bags, valve means intermittently to cause a counterflow of scavenging air through said bags, an endless chain, means on said chain to actuate the valve means pertaining to the several compartments in succession to initiate a counterflow of scavenging air therethrough, means on said chain to actuate the valve means to terminate the counterflow in the several compartments in succession to provide a scavenging period for each compartment in turn, means to retain said valve means in their set positions, and means on said chain to apply a series of movements to the agitating means for the bags during the scavenging period for each compartment.

4. A dust collector or filter according to claim 3 wherein the means to apply a series of movements to the agitating means comprise cams located laterally of the chain.

5. A dust collector or filter according to claim 3 wherein the means to apply a series of movements to the agitating means comprise elements attached to the side of the chain and a series of teeth on said elements.

6. A dust collector or filter comprising a plurality of filter bags, compartments for said bags, agitating means in said compartments for the bags, means to circulate dust-laden air through the bags, a pair of interlinking valves for each compartment to control the flow of air through the bags either in one direction or in the reversed direction, an endless control chain, a cam on one side of said chain to actuate successively the interlinked valves pertaining to the different compartments to initiate a scavening period in each compartment in turn with the air flowing in reversed direction through the bags, a cam on the opposite side of said chain to actuate the valves to terminate said scavening period, means to retain the interlinked valves in their set positions after operation by either cam, and means on said chain to apply successive movements to the agitating means pertaining to each compartment in turn during the scavenging period of said compartment.

7. A dust collector or filter comprising a plurality of filter bags, compartments for said bags, agitating means for the bags, means to circulate dust-laden air through the bags, valve means associated with each compartment intermittently to cause a counterflow of scavenging air through said bags, an endless control chain, cams on said chain to actuate the said valve means in succession, means to retain said valves in their set positions, means to support said cams at three points during operation of the valve means, one point being provided by a track at the bottom of the chain flight carrying the operative cams and the remaining points being provided by rollers above the said flight at opposite sides thereof, flanges attached to the chain at opposite sides thereof for co-operation with the said rollers, and means whereby said chain applies a succession of movements to said agitating means pertaining to each bag in turn to which the valve means are set to produce the counterflow.

8. A dust collector or filter comprising a plurality of filter bags, compartments for said bags, agitating means for the bags, means to circulate dust-laden air through the bags, valve means associated with each compartment to cause a counterflow of scavenging air through said bags, an endless chain, cams on said chain to actuate said valve means in turn to produce the counterflow through the bags in succession, means to retain the valve means in the position effecting such counterflow for a predetermined scavenging period, means to support said cams at three points during operation of the valve means, one point being provided by a track at the bottom of the chain flight carrying the operative cams and the remaining points being provided by rollers above the said flight at opposite sides thereof, flanges on said cams for cooperation with the said rollers, means whereby said chain effects repeated operation of said agitating means during the scavenging period, a track for the other flight of the chain, and rollers for engaging the edges of the said flanges to prevent lateral play thereof.

9. A dust collector or filter comprising a plurality of filter bags having weighted bottoms, agitating means to lift and lower said bottoms to agitate the bags, means to lift said bags also at an intermediate zone after the bottom has been lifted in the course of agitation, compartments for said bags, means to circulate dust-laden air through the bags, valve means intermittently to cause a counterflow of scavenging air through said bags, an endless control chain, spaced cams on said chain to operate said valve means to initiate the counterflow at the commencement of a scavenging period and to terminate the counterflow at the termination of the scavenging period, and means on said chain to operate the agitating means repeatedly during the scavenging cycle.

10. A dust collector or filter comprising a plurality of filter bags having weighted bottoms, lifting elements for raising and lowering the weighted bottoms to effect agitation thereon, abutment means on said lifting elements, elements associated with intermediate zones of said bags and engageable successively by said abutment means whereby said zones are successively lifted after lifting of the bottom in the course of agitation, means to circulate dust-laden air through the bags, valve means intermittently to cause a counterflow of scavenging air through said bags, an endless control chain, spaced cams on said chain to operate said valve means to initiate the counterflow at the commencement of a scavenging period and to terminate the counterflow at the termination of the scavening period, and means on said chain to operate the agitating means repeatedly during the scavenging cycle.

HORACE REGINALD HUTCHINGS.

REFERENCES CITED

The following references are of record in the file of this patent:

UNITED STATES PATENTS

| Number | Name | Date |
| --- | --- | --- |
| 456,810 | Gerard | July 28, 1891 |
| 1,454,248 | Marx | May 8, 1923 |
| 1,974,952 | Eiben | Sept. 25, 1934 |

FOREIGN PATENTS

| Number | Country | Date |
| --- | --- | --- |
| 654,807 | Germany | Dec. 30, 1937 |